United States Patent
Danielsson et al.

(10) Patent No.: US 11,275,624 B2
(45) Date of Patent: Mar. 15, 2022

(54) METHODS AND SYSTEMS FOR APPLICATION PROGRAM INTERFACE MANAGEMENT

(71) Applicant: QlikTech International AB, Lund (SE)

(72) Inventors: Mikael Danielsson, Lund (SE); Amanda Högberg, Lund (SE)

(73) Assignee: QLIKTECH INTERNATIONAL AB, Lund (SE)

( * ) Notice: Subject to any disclaimer, the term of this patent is extended or adjusted under 35 U.S.C. 154(b) by 0 days.

(21) Appl. No.: 16/441,455

(22) Filed: Jun. 14, 2019

(65) Prior Publication Data
US 2019/0384650 A1 Dec. 19, 2019

Related U.S. Application Data

(60) Provisional application No. 62/685,155, filed on Jun. 14, 2018.

(51) Int. Cl.
*G06F 3/00* (2006.01)
*G06F 9/54* (2006.01)
*G06F 8/65* (2018.01)
*G06F 8/71* (2018.01)

(52) U.S. Cl.
CPC ............ *G06F 9/54* (2013.01); *G06F 8/65* (2013.01); *G06F 8/71* (2013.01)

(58) Field of Classification Search
CPC .................................................. G06F 9/54
USPC ......................................................... 719/328
See application file for complete search history.

(56) References Cited

U.S. PATENT DOCUMENTS

| | | | |
|---|---|---|---|
| 7,774,826 B1* | 8/2010 | Romanek | H04L 67/306 726/1 |
| 2006/0200803 A1 | 9/2006 | Neumann et al. | |
| 2008/0072217 A1 | 3/2008 | Li et al. | |
| 2009/0164973 A1* | 6/2009 | Barnett | G06F 8/41 717/110 |
| 2011/0231832 A1* | 9/2011 | Dorn | G06F 8/65 717/170 |
| 2013/0191526 A1* | 7/2013 | Zhao | G06F 9/541 709/223 |

(Continued)

FOREIGN PATENT DOCUMENTS

EP 19180243.8 6/2019

OTHER PUBLICATIONS

Wei Zhou, REST API Design Patterns for SDN Northbound API. . (Year: 2014).*

(Continued)

*Primary Examiner* — Lechi Truong
(74) *Attorney, Agent, or Firm* — Ballard Spahr LLP

(57) ABSTRACT

Provided are methods and systems for application program interface (API) management. An API management device may receive requests from client devices to submit an API and/or API update for implementation. The API management device may determine an operable status of the API and/or the API update by determining whether the API and/or the API update is configured and/or updated for implementation. The API and/or the API update may be determined to be configured and/or updated for implementation when the API and/or the API update does not violate one or more rules. The API management device, based on operable status, may allow or deny the request for implementation.

16 Claims, 5 Drawing Sheets

(56) References Cited

U.S. PATENT DOCUMENTS

| | | | | |
|---|---|---|---|---|
| 2014/0237594 A1* | 8/2014 | Thakadu | ............... | G06F 21/52 |
| | | | | 726/23 |
| 2014/0317641 A1* | 10/2014 | Trofin | ................. | G06F 9/448 |
| | | | | 719/328 |
| 2019/0268442 A1* | 8/2019 | Puniani | .............. | H04L 67/10 |
| 2020/0007344 A1* | 1/2020 | Chepak, Jr | .......... | H04L 9/3247 |

OTHER PUBLICATIONS

European Search Report and Written Opinion, dated Oct. 31, 2019 by the European Patent Office for EP Application No. 19180243.8 and filed on Jun. 14, 2019 (Applicant-QlikTech International AB)(8 Pages).

U.S. Appl. No. 62/685,155, filed Jun. 14, 2018, Mikael Danielsson.

\* cited by examiner

METHODS AND SYSTEMS FOR APPLICATION PROGRAM INTERFACE MANAGEMENT

CROSS REFERENCE TO RELATED APPLICATION

This application claims priority to U.S. Provisional Application No. 62/685,155, filed on Jun. 14, 2018, herein incorporated by reference in its entirety.

BACKGROUND

A user using an application programming interface (API) to build and/or update an application (e.g., source code, etc.) can experience problems such as improper, incomplete, and/or noncompliant implementations. Such problems can be the result of changes in version, state, stability, and/or the like associated with an API. Even though an API (e.g., source code, etc.) may properly execute (e.g., compile and/or pass a test suite), a user may be unable to determine changes in version, state, stability, and/or the like associated with an API, prior to committing the application to a repository or deploying the application in a system or network. As such, an application implemented according to the API may perform improperly, fail, and/or be prone to security risk. These and other shortcomings are addressed by the methods and systems set forth herein.

SUMMARY

It is to be understood that both the following general description and the following detailed description are exemplary and explanatory only and are not restrictive. Provided are methods and systems for application program interface (API) management. An API management device (e.g., a server, an interface device, a version control device/system, a computing device, etc.) can receive a plurality of requests (e.g., commands, instructions, etc.) from a plurality of client devices (e.g., code generation devices, code management devices, API development devices, etc.) to submit an API and/or an API update (e.g., source code, etc.) for implementation (e.g., a code build, a code commit, a code distribution, etc.). The API management device can determine an operable status (e.g., operable index, operable value, etc.) of the API and/or the API update by determining whether the API is configured and/or updated for implementation. For example, a request (e.g., command, instruction, etc.) to implement an API and/or an API update can comprise a specification (e.g., API description, etc.) associated with the API and/or the API update (or a portion of the API and/or the API update). The API management device, based on data (e.g., metadata, etc.) associated with the specification can verify the operable status of the API and/or the API update. Verifying the operable status of the API and/or the API update can comprise one or more policy verifications to ensure that the API and/or the API update adheres to one or more API implementation policies. The API management device, based on the one or more policy verifications, can allow or deny the request for implementation.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
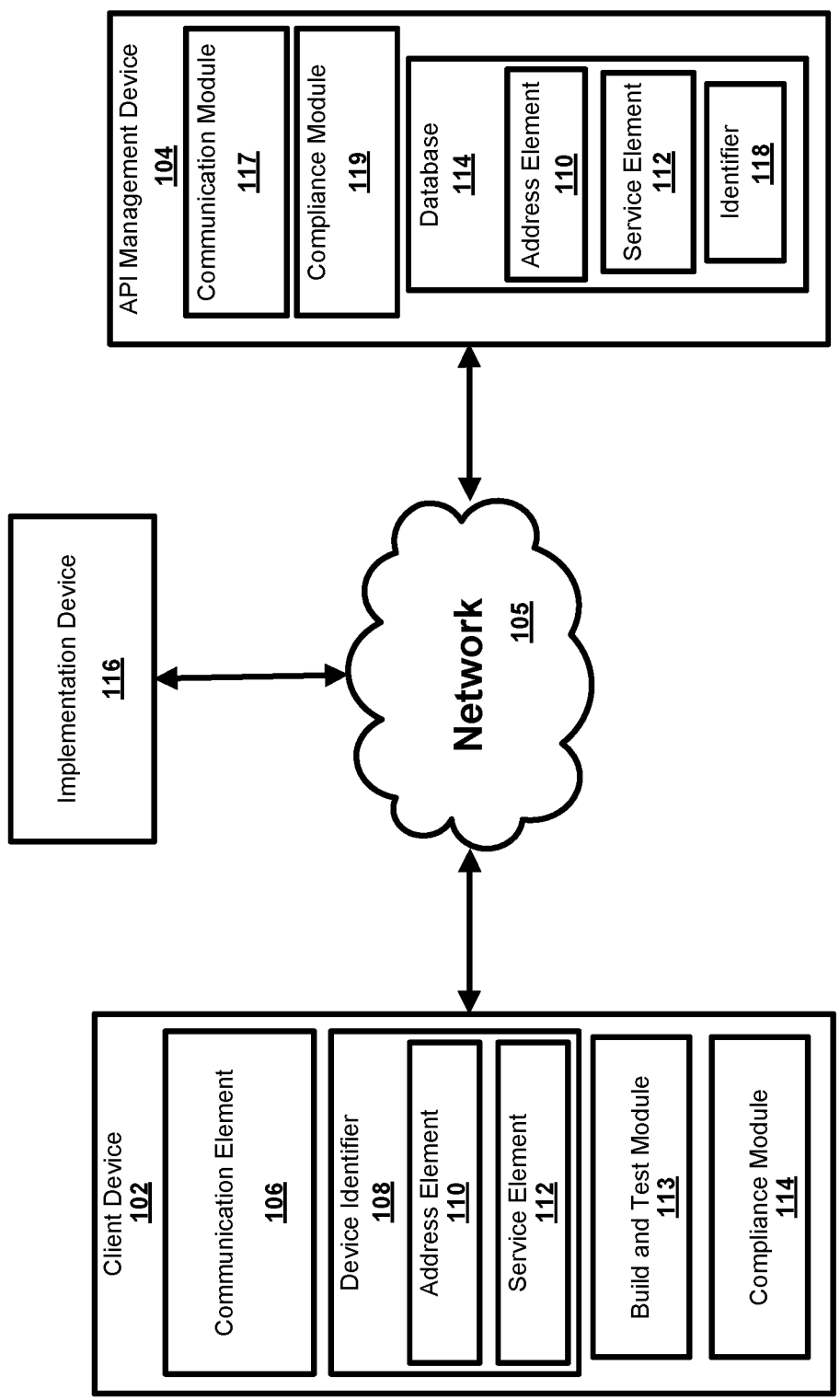
FIG. 1 is an example system in which the present methods and systems can operate.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects.

Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Provided are methods and systems for application program interface (API) management. An API management device (e.g., a server, an interface device, a version control device/system, a computing device, etc.) can receive a plurality of requests (e.g., commands, instructions, etc.) from a plurality of client devices (e.g., code generation devices, code management devices, API development devices, etc.) to submit an API and/or an API update (e.g., source code, etc.) for implementation (e.g., a code build, a code commit, a code distribution, etc.). The API management device can determine an operable status (e.g., operable index, operable value, etc.) of the API and/or the API update by determining whether the API and/or the API update is configured and/or updated for implementation. The API and/or the API update can be determined to be configured and/or updated for implementation if the API and/or the API update does not violate one or more rules (e.g., one or more rules of an API governance policy, etc.). For example, a request (e.g., command, instruction, etc.) to implement an API and/or an API update can comprise a specification (e.g., API description, etc.) associated with the API and/or the API update (or a portion of the API and/or the API update). The API management device, based on data (e.g., metadata, etc.) associated with the specification can determine the operable status of the API and/or the API update.

Determining an operable status of an API and/or an API update can comprise determining whether the API and/or the API update adheres to and/or violates one or more rules (e.g., policies, etc.). The one or more rules can be associated with versioning, visibility, deprecation, and the like. For example, the API management device (e.g., a server, an interface device, a version control device/system, a computing device, etc.) can determine a current version of an API, assign a version to the API, determine a version history associated with an API, and the like. The API management device can determine/verify a visibility attribute associated with an API. For example, the API management device can determine if an API and/or an API update (or a portion of the API and/or the API update) is private, public, partnered, or the like). The API management device can determine/verify a stability/developmental rule/status associated with an API and/or an API update. For example, the API management device can determine if an API and/or an API update (or a portion of the API and/or the API update) is in an experimental state (e.g., operating below a performance threshold, etc.), a stable state (e.g., operating according to a performance threshold, etc.), or a locked state, and/or the like. The API management device can determine/verify a deprecation rule associated with an API and/or an API update. For example, the API management device can determine portions of an API and/or an API update that have been removed, modified, or the like in accordance with and/or in violation of one or more settings (e.g., rules, attributes, policies, an API governance policy, etc.), such as a predefined time period.

The API management device, based on the operable status of an API and/or an API update, can allow or deny a request for implementation. For example, the API management device can determine the operable status of an API and/or an API update and/or update the operable status of the API and/or the API update prior to submitting (e.g., transmitting, providing, etc.) the API and/or the API update (e.g., source code, etc.) to one or more implementation devices (e.g., code repositories, code executors, production servers, etc.).

The methods and systems described herein for API management may be used to improve functioning of a code development environment by preventing APIs and/or API updates (e.g., source codes, etc.) from being implemented with a misconfiguration(s) that may limit, prevent, or alter functionality of an API and/or an API update, even though the API and/or the API update (e.g., source code, etc.) may compile and/or pass an API test suite. For example, an API management device can be used to verify that an API and/or an API update can operate as expected, such as without errors and/or according to a requirements specification. Additionally, an API management device can identify/prevent regressions between API and/or API update releases. Thus, the methods and systems described herein for API management represent an improvement to existing API management methods and systems known in the art.

FIG. 1 illustrates various aspects of an exemplary environment in which the present methods and systems can operate. The present disclosure is relevant to systems and methods for application program interface (API) management. Those skilled in the art will appreciate that present methods may be used in various types of networks and systems that employ both digital and analog equipment. One skilled in the art will appreciate that provided herein is a functional description and that the respective functions can be performed by software, hardware, or a combination of software and hardware.

The system 100 can comprise a client device 102 in communication with an application program interface (API) management device 104 (e.g., a server, an interface device, a version control device/system, a computing device, etc.). The API management device 104 can be disposed locally or remotely relative to the client device 102. As an example, the client device 102 and the API management device 104 can be in communication via a private and/or public network 105 such as the Internet or a local area network. Other forms of communications can be used such as a direct interface, as well as wired and wireless telecommunication channels, for example.

The client device 102 can be a device such as a code generation device, a code management device, an API development device, a computer, a smartphone, a laptop, a tablet, or other device capable of communicating with the API management device 104 (e.g., server, interface device, version control device/system, computing device, etc.). As an example, the client device 102 can comprise a communication element 106 for providing an interface to a user (e.g., a developer) to interact with the client device 102 and/or the API management device 104. The communication element 106 can be any interface for presenting and/or receiving information to/from the user, such as user feedback. An example interface may be communication interface such as a web browser (e.g., Internet Explorer®, Mozilla Firefox®, Google Chrome®, Safari®, or the like). Other software, hardware, and/or interfaces can be used to provide communication between the user and one or more of the client device 102 and the API management device 104. As an example, the communication element 106 can request or query various files from a local source and/or a remote source. As a further example, the communication element 106 can transmit data (e.g., source code, code commit requests/commands, etc.) to a local or remote device such as the API management device 104.

The client device 102 can be associated with a client identifier or device identifier 108. As an example, the device identifier 108 can be any identifier, token, character, string, or the like, for differentiating one user (e.g., developer, etc.) or client device (e.g., client device 102) from another user or client device. The device identifier 108 can identify a user or client device as belonging to a particular class of users or client devices. As a further example, the device identifier 108 can comprise information relating to the client device 102 such as a manufacturer, a model or type of device, a service provider associated with the client device 102, a state of the client device 102, a locator, and/or a label or classifier. Other information can be represented by the device identifier 108.

The device identifier 108 can comprise an address element 110 and a service element 112. The address element 110 can comprise or provide an internet protocol address, a network address, a media access control (MAC) address, an Internet address, or the like. For example, the address element 110 can be relied upon to establish a communication session between the client device 102 and the API management device 104 (e.g., server, interface device, version control device/system, computing device, etc.) or other devices and/or networks. As a further example, the address element 110 can be used as an identifier or locator of the client device 102. The address element 110 can be persistent for a particular network.

The service element 112 can comprise an identification of a service provider associated with the client device 102 (e.g., code generation device, code management device, API development device, etc.) and/or with the class of client device 102. The class of the client device 102 can be related to a type of device, capability of device, type of service being provided, and/or a level of service (e.g., business class, service tier, service package, etc.). As an example, the service element 112 can comprise information relating to or provided by a communication service provider (e.g., Internet service provider) that is providing or enabling data flow such as communication services to the client device 102. As a further example, the service element 112 can comprise information relating to a preferred service provider for one or more particular services relating to the client device 102. In an aspect, the address element 110 can be used to identify or retrieve data from the service element 112, or vice versa. As a further example, one or more of the address element 110 and the service element 112 can be stored remotely from the client device 102 and retrieved by one or more devices such as the client device 102 and the API management device 104. Other information can be represented by the service element 112.

The client device 102 (e.g., code generation device, code management device, API development device, etc.) can comprise a build and test module 113. A user (e.g., developer, etc.) can use the client device 102 to generate/develop and application program interface (API) and/or an API update. The build and test module 113 can define semantics of an API and/or an API update. The build and test module 113 can determine an architecture style of an API and/or an API update (e.g., an event-driven API, a CRUD-based API, a hypermedia API, etc.). The build and test module 113 can define resources and resource states of an API and/or an API update. The build and test module 113 can determine a specification for an API and/or an API update to facilitate API and/or an API update usage and implementation. For example, the build and test module 113 can determine a specification for an API and/or an API update that defines routines, data structures, object classes, variables, and the like associated with the API and/or the API update. The build and test module 113 can provide an API and/or an API update to the API management device 104 (e.g., server, interface device, version control device/system, computing device, etc.) for analysis. For example, the build and test module 113 can provide an API and/or an API update to the API management device 104 for analysis via a request, such as HTTP POST or any other related method.

The API management device 104 can be a device such as a server, an interface device, a version control device/system, a computing device, and/or the like. The API management device 104 can communicate with the client device 102 (e.g., code generation device, code management device, API development device, etc.) for providing data and/or services. As an example, the API management device 104 can provide services such as API management service (e.g., API versioning, API visibility analysis, API deprecation analysis, API break change analysis, etc.). The API management device 104 can allow the client device 102 to interact with remote resources such as data, devices, and files. For example, the API management device 104 can be configured as (or disposed at) a central location (e.g., a headend, or processing facility), which can receive content (e.g., applications, source code, data, etc.) from multiple sources. The API management device 104 can combine the content from the multiple sources and can distribute the content to user (e.g., developer, subscriber, etc.) locations via a distribution system.

The API management device 104 (e.g., server, interface device, version control device/system, computing device, etc.) can manage the communication between the client device 102 (e.g., code generation device, code management device, API development device, etc.) and a database 114 for sending and receiving data therebetween. For example, the database 114 can store a plurality of files (e.g., operable statuses, stability indices, visibility attributes, deprecation policies, API source code, API statistical information, API policy information, code commit information, pull requests, etc.), client identifiers and/or records, or other information. As a further example, the client device 102 can request and/or retrieve a file from the database 114. The database 114 can store information relating to the client device 102 such as the address element 110 and/or the service element 112. As an example, the API management device 104 can obtain the device identifier 108 from the client device 102 and retrieve information from the database 114 such as the address element 110 and/or the service elements 112. As a further example, the API management device 104 can obtain the address element 110 from the client device 102 and can retrieve the service element 112 from the database 114, or vice versa. Any information can be stored in and retrieved from the database 114. The database 114 can be disposed remotely from the API management device 104 and accessed via direct or indirect connection. The database 114 can be integrated with the computing system 104 or some other device or system.

The API management device 104 (e.g., server, interface device, version control device/system, computing device, etc.) can receive an application programming interface (API) from a client device (e.g., the client device 102, a code generation device, a code management device, an API development device, etc.) or any other device. The API management device 104 can receive an API from a client device e.g., the client device 102, a code generation device, a code management device, an API development device, etc.) or any other device via a communication module 117. The communication module 117 can support a variety of communication protocols and communication techniques. For example, the communication module 117 can support communication protocols, such as hypertext transfer protocol (HTTP) (e.g., HTTP POST, HTTP REST, HTTP GET, HTTP PULL, HTTP PUSH, etc.), transmission control protocol (TCP), user datagram protocol (UDP), and/or any other protocol. The communication module 117 can support communication techniques such as long-range communication techniques (e.g., Internet, cellular, satellite, etc.), and short-range communication techniques (e.g., BLUETOOTH®, near-field communication, infrared, etc.).

The API management device 104 (e.g., server, interface device, version control device/system, computing device, etc.) can transmit and/or provide APIs received via the communication module 117 to an implementation device 116 (e.g., code repository, code executor, production server, etc.) for implementation. For example, the communication module 117 can comprise a representational state transfer (REST) interface for receiving API objects. The API management device 104 can, prior to transmitting and/or providing an API and/or an API update to the implementation device 116, can analyze API objects and determine an operable status (e.g., operable index, operable value, etc.) of the API and/or the API update. The API management device 104 can determine an operable status of the API and/or the API update and, based on the operable status, either proceed with or terminate transmitting and/or providing the API (or any API) to an implementation device 116 for implementation. Terminating, based on the operable status, a transmission of an API and/or an API update to an implementation device 116 can prevent the API and/or the API update (or any API/API update) from being implemented with misconfiguration that can limit, prevent, or alter functionality of the API and/or the API update. A misconfiguration can limit, prevent, or alter functionality of an API and/or an API update even though the API and/or the API update may compile and/or pass an API test suite (e.g., the build and test module 113).

The API management device 104 (e.g., server, interface device, version control device/system, computing device, etc.) can determine an operable status (e.g., operable index, operable value, etc.) of an API and/or an API update by determining whether the API and/or the API update is configured and/or updated for implementation. For example, a request (e.g., command, instruction, etc.) to implement an API and/or an API update can comprise a specification (e.g., API description, etc.) associated with the API and/or the API update (or a portion of the API and/or the API update). The API management device 104, based on data (e.g., metadata, etc.) associated with the specification can determine the operable status of the API and/or the API update.

The API management device 104 (e.g., server, interface device, version control device/system, computing device, etc.) can comprise a compliance module 119. The compliance module 119 can determine whether the API and/or the API update adheres to and/or violates one or more rules (e.g., policies, etc.). The one or more rules can be associated with versioning, visibility, deprecation, and the like. The compliance module 119 can ensure that all APIs (or API updates) are verified/validated/approved for implementation (e.g., API implementation via the implementation device 116, etc.) and adhere to the one or more rules (e.g., policies, etc.). The compliance module 119, based on the one or more rules can determine an operable status (e.g., operable index, operable value, etc.) of an API and/or an API update.

The compliance module 119 can determine an operable status of an API and/or an API update based on versioning associated with the API and/or the API update. For example, the compliance module 119 can determine a current version of an API and/or an API update, assign a version to an API and/or an API update, determine a version history associated with an API and/or an API update, and the like. The compliance module 119 can determine a current version of an API and/or an API update, assign a version to an API and/or an API update, determine a version history associated with an API and/or an API update, and the like based on a specification associated with the API and/or the API update (e.g., a value within the specification, etc.). For example, the API management device 104 can receive an API and/or an API update and an associated API specification from a client device (e.g., the client device 102, etc.). The API management device 104 can store the API specification (e.g., API specifications can be stored in a database 114, etc.). The compliance module 119 can use the API specifications as baseline information for determining changes (e.g., version changes, etc.) to an API based on API update information received from a client device (e.g., the client device 102, etc.). The compliance module 119 can determine changes (e.g., version changes, etc.) to an API to ensure that the API, when implemented, performs as a user (e.g., developer, etc.) may expect. The compliance module 119 can enable/disable changes to an API. For example, when the API management device 104 (e.g., the compliance module 119) receives an API update comprising a major version update of the API, then one or more portions of the API can be added, removed, or updated.

The compliance module 119 can determine an operable status of an API and/or an API update based on a visibility attribute associated with the API. For example, the API management device, based on an API specification, can determine if the API and/or the API update (or a portion of the API and/or the API update) is private, public, partnered, restricted, or the like. The API management device 104 (e.g., the compliance module 119) can ensure that one or more rules (e.g., a policy, etc.) associated with the API and/or the API update are adhered to by the API and/or the API update. For example, the compliance module 119 can be configured to prevent a visibility attribute associated with an API and/or an API update from transitioning from "Public" to "Private" without first being deprecated according to the one or more rules (e.g., the policy, an API governance policy, etc.). The compliance module 119 can be configured to automatically update API specification (e.g., API specification information stored in the database 114, etc.) according to a visibility attribute update, change, and/or modification.

The compliance module 119 can determine an operable status of an API and/or an API update based on a stability index associated with the API and/or the API update. For example, the compliance module 119 can determine/verify a stability index (e.g., stability attribute, developmental rule, status, etc.) associated with an API and/or an API update. A stability index can indicate whether an API and/or an API update (or a portion of the API and/or the API update) is in an experimental state (e.g., an API/API update under development, an API/API update operating below a performance threshold, an API/API update the may be removed based on versioning, etc.), a stable state (e.g., a reliable API/API update, an API/API update not subject to change or revision, an API/API update operating according to a performance threshold, etc.), a locked state (e.g., a API/API update that is significantly reliable and/or not subject to a change or revision, etc.) and/or the like. The compliance module 119, based on a stability index, can ensure development and implementation of an API and/or an API update can only move in one direction, such as from an experimental state, to a stable state, to a locked state.

The compliance module 119 can determine an operable status of an API and/or an API update based on a deprecation rule associated with the API and/or the API update. The compliance module 119 can determine/verify a deprecation rule associated with an API and/or an API update based on information received with the API and/or an API update (e.g., an API specification, etc.). The compliance module 119, based on a deprecation rule, can determine portions of an API and/or an API update that have removed, modified, or the like in accordance to and/or in violation of one or more settings (e.g., rules, attributes, deprecation policies, etc.), such as a determined time period. The determined time period can be based on a visibility attribute, a stability index, or any other factor. For example, the compliance module 119 can determine whether a portion of an API has been removed, modified, or the like, such as by an API update, by determining a date of deprecation associated with the portion of the API. The compliance module 119 can determine a deprecation period for the portion of the API and determine whether a time period between a date of the API update and the date of deprecation exceeds the deprecation period.

The API management device 104, based on the operable status of an API and/or an API update, can allow or deny a request from a client device (e.g., the client device 102) or any other device for implementation of an API and/or an API update. For example, the API management device 104 can determine the operable status of an API and/or update the operable status of the API prior to submitting (e.g., transmitting, providing, etc.) the API (e.g., source code, etc.) to an implementation device (e.g., the implementation device 116, a code repository, a code executors, a production server, etc.). Determine the operable status of an API and/or update the operable status of the API prior to submitting the API to an implementation device improves functioning of a code (e.g., API, etc.) development environment by preventing APIs (e.g., source codes, etc.) and/or API updates from being implemented with misconfiguration that can limit, prevent, or alter functionality of an API.

In an aspect, the client device 102, the API management device 104, and the implementation device 116 can be parts/components of a single device. In an aspect, the client device 102, the API management device 104, and the implementation device 116 can be separate devices.

Figure 2:
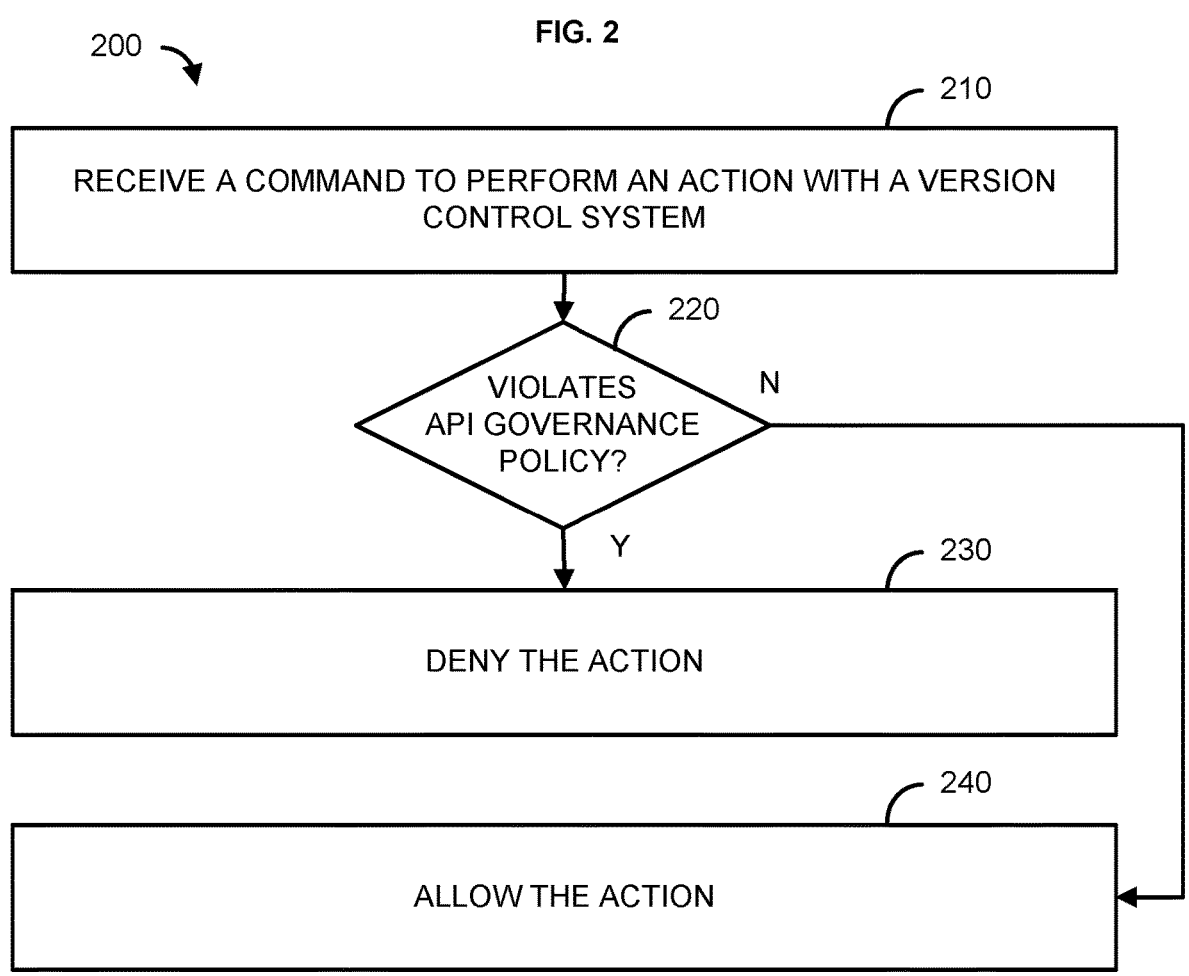
FIG. 2 is a flowchart of an example method.

FIG. 2 is a flowchart of an example method 200 for API management. At 210, a command/request to implement an API and/or an API update can be received. An application program interface (API) management device (e.g., the API management device 104, version control system, etc.) can receive a command/request to implement an API and/or an API update. The command/request can be from a client device (e.g., the client device 102, a code generation device, a code management device, an API development device, etc.). Implementing the API and/or the API update can comprise transmitting/providing the API and/or the API update to an implementation device (e.g., the implementation device 116, a code repository, a code executor, a production server, etc.) to perform a code commit (e.g., a push request etc.), or any other operation. In an aspect, implementing an API and/or an API update can comprise transmitting/providing the API and/or the API update to an implementation device and/or an API management device to perform a code pull (e.g., a pull request, etc.). In an aspect, implementing an API and/or an API update can comprise transmitting/providing the API (e.g., source code, executable, etc.) and/or the API update to an implementation device with the executable including a compiled version of the API and/or the API update.

At 220, it can be determined if the API and/or the API update violates one or more rules (e.g., one or more rules of an API governance policy, etc.), such as one or more rules that must be adhered to after an update is implemented. The application program interface (API) management device (e.g., the API management device 104, version control system, etc.) can determine whether the API and/or the API update violates one or more rules (e.g., one or more rules of an API governance policy, etc.). The one or more rules (e.g., one or more rules of an API governance policy, etc.) can be applicable to compilable and/or non-compilable code. The one or more rules can be based on visibility, stability, deprecation, and/or the like.

The API management device (e.g., the API management device 104, version control system, etc.) can determine if the API and/or the API update violates one or more rules (e.g., one or more rules of an API governance policy, etc.) associated with versioning. For example, the API management device can determine whether the API and/or the API update violates the one or more rules by determining whether a version number associated with the API and/or the API update is incremented according to the one or more rules. The API management device can determine a current version of the API and/or the API update, assign a version to the API and/or the API update, determine a version history associated with the API and/or the API update, and the like based on an API specification associated with the API and/or the API update. The API management device can receive the API specification from the client device. The API management device can use the API specification as baseline information to determine if changes (e.g., version changes, etc.) to the API and/or the API update violate the one or more rules (e.g., the one or more rules of an API governance policy, etc.).

The API management device (e.g., the API management device 104, version control system, etc.) can determine changes (e.g., version changes, etc.) to an API and/or an API update to ensure that the API and/or the API update, when implemented, performs as a user (e.g., developer, etc.) may expect. The API management device can enable/disable changes to an API and/or an API update. For example, when the API management device receives an API and/or an API update comprising a major version update of the API, then one or more portions of the API and/or an API update can be added, removed, or updated.

The API management device (e.g., the API management device 104, version control system, etc.) can determine if the API and/or the API update violates one or more rules (e.g., one or more rules of an API governance policy, etc.) associated with a visibility attribute of the API and/or the API update. For example, the API management device, based on the API specification, can determine whether the API and/or the API update (or a portion of the API and/or the API update) is private, public, partnered, restricted, or the like. For example, the API specification may indicate a particular visibility attribute to be associated with the API and/or the API update (or a portion of the API and/or the API update). The API management device can access code associated with the API and/or the API update (or a portion of the API and/or the API update) to determine if a visibility attribute within the code coincides with a the visibility attribute indicated by the API specification. The API management device can be configured to prevent a visibility attribute associated with an API (e.g., a non-deprecated portion of the API) from transitioning from "Public" (e.g., as indicated by the API specification) to "Private" without first being deprecated according to the one or more rules (e.g., one or more rules of an API governance policy, etc.). The API management device can be configured to automatically update an API specification (e.g., API specification information stored in the database 114, etc.) according to a visibility attribute update, change, and/or modification.

The API management device (e.g., the API management device 104, version control system, etc.) can determine if the API and/or the API update violate one or more rules (e.g., one or more rules of an API governance policy, etc.) associated with stability (e.g., a stability index associated with an API and/or an API update). For example, the API management device can determine/verify a stability index (e.g., stability attribute, developmental rule, status, etc.) associated with an API and/or an API update. A stability index can indicate whether the API and/or the API update (or a portion of the API and/or the API update) is in an experimental state (e.g., an API under development, an API operating below a performance threshold, an API the may be removed based on versioning, etc.), a stable state (e.g., a reliable API, an API not subject to change or revision, an API operating according to a performance threshold, etc.), a locked state (e.g., a API that is significantly reliable and/or not subject to a change or revision, etc.) and/or the like. The API management device, based on a stability index, can determine if the API and/or the API update violate one or more rules (e.g., one or more rules of an API governance policy, etc.) associated with development and implementation of the API and/or the API update can only move in one direction, such as from an experimental state, to a stable state, to a locked state.

The API management device (e.g., the API management device 104, version control system, etc.) can determine if the API and/or the API update violate one or more rules (e.g., one or more rules of an API governance policy, etc.) associated with deprecation of the API and/or the API update. The API management device can determine/verify a deprecation rule associated with an API based on information received with the API (e.g., an API specification, etc.). The API management device, based on a deprecation rule, can determine portions of an API that have removed, modified, or the like in accordance to and/or in violation of the one or more rules (e.g., one or more rules of an API governance policy, etc.), such as a determined time period. The determined time period can be based on the visibility attribute, the stability index, or any other factor. For example, the API management device can determine whether a portion of an API and/or the API update has been removed, modified, or the like, such as by an API update, by determining a date of deprecation associated with the portion of the API and/or the API update. The API management device can determine a deprecation period for the API and/or the API update and determine whether a time period between a date of the API and/or the API update and the date of deprecation exceeds the deprecation period.

Based on whether API and/or the API update violate the one or more rules (e.g., the one or more rules of an API governance policy, etc.), the API management device (e.g., the API management device 104, version control system, etc.) can either deny or allow the command/request to implement the API and/or the API update.

At 230, the command/request to implement the API and/or the API update can be denied. The command/request to implement the API and/or the API update can be denied if the API and/or the API update violate the one or more rules (e.g., the one or more rules of an API governance policy, etc.). The API management device (e.g., the API management device 104, version control system, etc.) can deny the command/request to implement the API and/or the API update. Denying the command/request to implement the API and/or the API update can comprise denying a command/request to perform a code commit (e.g., a push request etc.), or any other operation. Denying the command/request to implement the API and/or the API update can prevent APIs and/or the API updates from being committed to a implementation device (e.g., the implementation device 116, a code repository, a code executor, a production server, etc.) that do not adhere to an expected API functionality and/or convention, even though the APIs and/or the API updates (e.g., source code) may compile without error and/or pass through a test suite.

At 240, the command/request to implement the API and/or the API update can be allowed. The command/request to implement the API and/or the API update can be allowed if the API and/or the API update do not violate the one or more rules (e.g., the one or more rules of an API governance policy, etc.). The API management device (e.g., the API management device 104, version control system, etc.) can allow the command/request to implement the API and/or the API update. Allowing the command/request to implement the API and/or the API update can comprise allowing a command/request to perform a code commit (e.g., a push request etc.), or any other operation.

Figure 3:
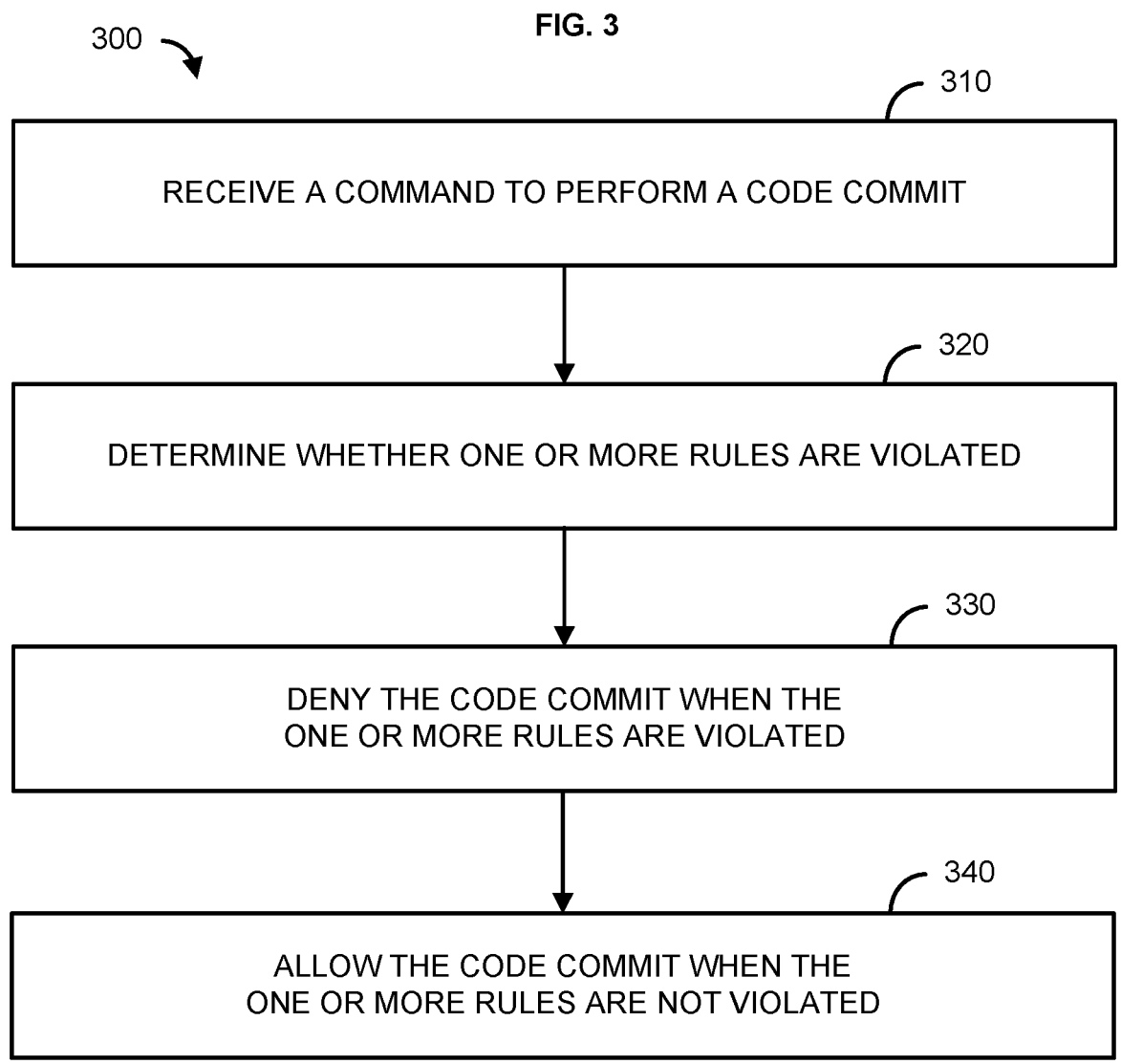
FIG. 3 is a flowchart of an example method.

FIG. 3 is a flowchart of an example method 300 for application program interface (API) management. At step 310, a command to perform a code commit comprising an Application Program Interface (API) update may be received. As an example, an API management device (e.g., the API management device 104, version control system, etc.) may receive the command from a client device (e.g., the client device 102, a code generation device, a code management device, an API development device, etc.). Implementing the command to perform the code commit (e.g., implementing the API and/or performing an update to the API) may comprise transmitting/providing the code commit to an implementation device (e.g., the implementation device 116, a code repository, a code executor, a production server, etc.). The implementation device may carry out performance of the code commit (e.g., a push request etc.), or any other operation related to the command. In an aspect, receiving the command to perform the code commit may cause the API management device to perform a code pull (e.g., a pull request, etc.) related to the command. In an aspect, receiving the command to perform the code commit may cause the API management device to send the command to an implementation device with an executable including a compiled version of the API and/or the API update.

At step 320, the API management device may determine whether the API update violates one or more rules (e.g., one or more rules of an API governance policy, etc.), such as one or more rules that must be adhered to after an update is implemented. The one or more rules may be applicable to compilable and/or non-compilable code. The one or more rules may be based on visibility, stability, deprecation, and/or the like. In determining whether the API update violates the one or more rules, the API management device may determine whether a version number associated with the API and/or API update is incremented according to the one or more rules. The API management device can determine a current version of the API and/or the API update, assign a version to the API and/or the API update, determine a version history associated with the API and/or the API update, and the like based on an API specification associated with the API and/or the API update. The API management device can receive the API specification from the client device. The API management device can use the API specification as baseline information to determine if changes (e.g., version changes, etc.) to the API and/or the API update violate the one or more rules (e.g., the one or more rules of an API governance policy, etc.). The API management device can determine changes (e.g., version changes, etc.) to an API and/or an API update to ensure that the API and/or the API update, when implemented, performs as a user (e.g., developer, etc.) may expect. The API management device can enable/disable changes to an API and/or an API update. For example, when the API management device receives an API and/or an API update comprising a major version update of the API, then one or more portions of the API and/or an API update can be added, removed, or updated.

In determining whether the API update violates the one or more rules, the API management device may determine whether the API and/or the API update violates a rule(s) (e.g., one or more rules of an API governance policy, etc.) associated with a visibility attribute of the API and/or the API update. For example, the API management device, based on the API specification, can determine whether the API and/or the API update (or a portion of the API and/or the API update) is private, public, partnered, restricted, or the like. For example, the API specification may indicate a particular visibility attribute to be associated with the API and/or the API update (or a portion of the API and/or the API update). The API management device can access code associated with the API and/or the API update (or a portion of the API and/or the API update) to determine if a visibility attribute within the code coincides with a the visibility attribute indicated by the API specification. The API management device can be configured to prevent a visibility attribute associated with an API (e.g., a non-deprecated portion of the API) from transitioning from "Public" (e.g., as indicated by the API specification) to "Private" without first being deprecated according to the one or more rules (e.g., one or more rules of an API governance policy, etc.). The API management device can be configured to automatically update an API specification (e.g., API specification information stored in the database 114, etc.) according to a visibility attribute update, change, and/or modification.

In determining whether the API update violates the one or more rules, the API management device may determine whether the API and/or the API update violates a rule(s) (e.g., one or more rules of an API governance policy, etc.) associated with stability (e.g., a stability index associated with an API and/or an API update). For example, the API management device can determine/verify a stability index (e.g., stability attribute, developmental rule, status, etc.) associated with an API and/or an API update. A stability index can indicate whether the API and/or the API update (or a portion of the API and/or the API update) is in an experimental state (e.g., an API under development, an API operating below a performance threshold, an API the may be removed based on versioning, etc.), a stable state (e.g., a reliable API, an API not subject to change or revision, an API operating according to a performance threshold, etc.), a locked state (e.g., a API that is significantly reliable and/or not subject to a change or revision, etc.) and/or the like. The API management device, based on a stability index, can determine if the API and/or the API update violate one or more rules (e.g., one or more rules of an API governance policy, etc.) associated with development and implementation of the API and/or the API update can only move in one direction, such as from an experimental state, to a stable state, to a locked state.

In determining whether the API update violates the one or more rules, the API management device may determine whether the API and/or the API update violate a rule(s) (e.g., one or more rules of an API governance policy, etc.) associated with deprecation of the API and/or the API update. The API management device can determine/verify a deprecation rule associated with an API based on information received with the API (e.g., an API specification, etc.). The API management device, based on a deprecation rule, can determine portions of an API that have removed, modified, or the like in accordance to and/or in violation of the one or more rules (e.g., one or more rules of an API governance policy, etc.), such as a determined time period. The determined time period can be based on the visibility attribute, the stability index, or any other factor. For example, the API management device can determine whether a portion of an API and/or the API update has been removed, modified, or the like, such as by an API update, by determining a date of deprecation associated with the portion of the API and/or the API update. The API management device can determine a deprecation period for the API and/or the API update and determine whether a time period between a date of the API and/or the API update and the date of deprecation exceeds the deprecation period.

Based on whether the API update violates the one or more rules (e.g., the one or more rules of an API governance policy, etc.), the API management device may either deny or allow the command. At step 330, the command may be denied based on a determination that the API update violates the one or more rules. Denying the command may comprise denying a command to perform a code commit (e.g., a push request etc.), or any other operation. Denying the command may prevent APIs and/or the API updates from being committed to an implementation device (e.g., the implementation device 116, a code repository, a code executor, a production server, etc.) that does not adhere to an expected API functionality and/or convention, even though the APIs and/or the API updates (e.g., source code) may compile without error and/or pass through a test suite. At step 340, the command may be allowed based on a determination that the API update does not violate the one or more rules. Allowing the command to may comprise allowing a command to perform a code commit (e.g., a push request etc.), or any other operation.

Figure 4:
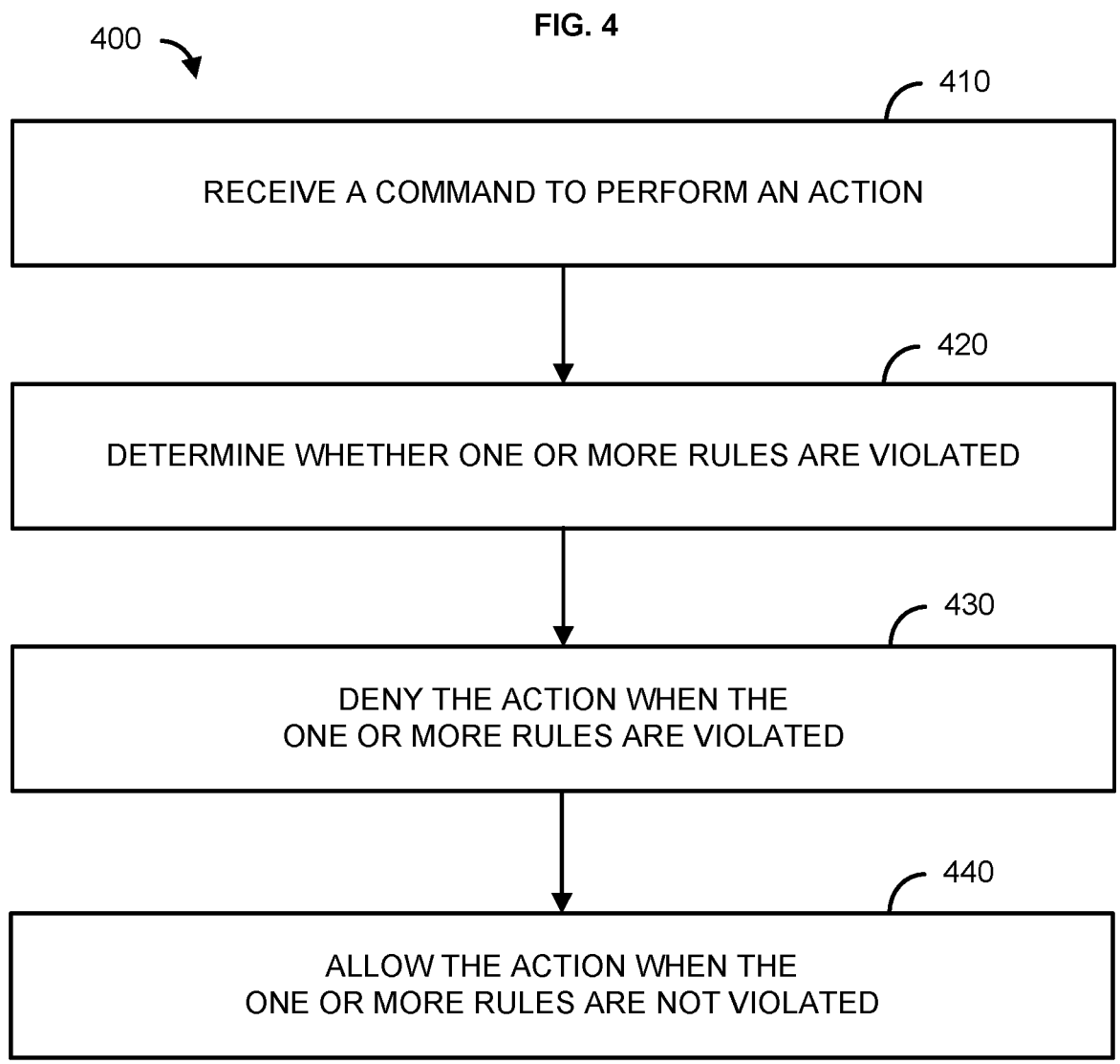
FIG. 4 is a flowchart of an example method.

FIG. 4 is a flowchart of an example method 400 for application program interface (API) management. At step 410, a command to perform an action with a version control system may be received. As an example, an API management device (e.g., the API management device 104, version control system, etc.) may receive the command from a client device (e.g., the client device 102, a code generation device, a code management device, an API development device, etc.). The action may be associated with an API update. Implementing the command (e.g., implementing and/or performing the API update) may comprise transmitting/providing the command to perform the action with the version control system to an implementation device (e.g., the implementation device 116, a code repository, a code executor, a production server, etc.). The implementation device may carry out performance of the action or any other operation related to the action. In an aspect, the action may comprise a code commit to the version control system, a code pull from the version control system (e.g., a pull request, etc.), a deployment to a server, a combination thereof and/or the like.

At step 420, the API management device may determine whether the API update violates one or more rules (e.g., one or more rules of an API governance policy, etc.), such as one or more rules that must be adhered to after an update is implemented. The one or more rules may be applicable to compilable and/or non-compilable code. The one or more rules may be based on visibility, stability, deprecation, and/or the like. In determining whether the API update violates the one or more rules, the API management device may determine whether a version number associated with the API and/or API update is incremented according to the one or more rules. The API management device can determine a current version of the API and/or the API update, assign a version to the API and/or the API update, determine a version history associated with the API and/or the API update, and the like based on an API specification associated with the API and/or the API update. The API management device can receive the API specification from the client device. The API management device can use the API specification as baseline information to determine if changes (e.g., version changes, etc.) to the API and/or the API update violate the one or more rules (e.g., the one or more rules of an API governance policy, etc.). The API management device can determine changes (e.g., version changes, etc.) to an API and/or an API update to ensure that the API and/or the API update, when implemented, performs as a user (e.g., developer, etc.) may expect. The API management device can enable/disable changes to an API and/or an API update. For example, when the API management device receives an API and/or an API update comprising a major version update of the API, then one or more portions of the API and/or an API update can be added, removed, or updated.

In determining whether the API update violates the one or more rules, the API management device may determine whether the API and/or the API update violates a rule(s) (e.g., one or more rules of an API governance policy, etc.) associated with a visibility attribute of the API and/or the API update. For example, the API management device, based on the API specification, can determine whether the API and/or the API update (or a portion of the API and/or the API update) is private, public, partnered, restricted, or the like. For example, the API specification may indicate a particular visibility attribute to be associated with the API and/or the API update (or a portion of the API and/or the API update). The API management device can access code associated with the API and/or the API update (or a portion of the API and/or the API update) to determine if a visibility attribute within the code coincides with a the visibility attribute indicated by the API specification. The API management device can be configured to prevent a visibility attribute associated with an API (e.g., a non-deprecated portion of the API) from transitioning from "Public" (e.g., as indicated by the API specification) to "Private" without first being deprecated according to the one or more rules (e.g., one or more rules of an API governance policy, etc.). The API management device can be configured to automatically update an API specification (e.g., API specification information stored in the database 114, etc.) according to a visibility attribute update, change, and/or modification.

In determining whether the API update violates the one or more rules, the API management device may determine whether the API and/or the API update violates a rule(s) (e.g., one or more rules of an API governance policy, etc.) associated with stability (e.g., a stability index associated with an API and/or an API update). For example, the API management device can determine/verify a stability index (e.g., stability attribute, developmental rule, status, etc.) associated with an API and/or an API update. A stability index can indicate whether the API and/or the API update (or a portion of the API and/or the API update) is in an experimental state (e.g., an API under development, an API operating below a performance threshold, an API the may be removed based on versioning, etc.), a stable state (e.g., a reliable API, an API not subject to change or revision, an API operating according to a performance threshold, etc.), a locked state (e.g., a API that is significantly reliable and/or not subject to a change or revision, etc.) and/or the like. The API management device, based on a stability index, can determine if the API and/or the API update violate one or more rules (e.g., one or more rules of an API governance policy, etc.) associated with development and implementation of the API and/or the API update can only move in one direction, such as from an experimental state, to a stable state, to a locked state.

In determining whether the API update violates the one or more rules, the API management device may determine whether the API and/or the API update violate a rule(s) (e.g., one or more rules of an API governance policy, etc.) associated with deprecation of the API and/or the API update. The API management device can determine/verify a deprecation rule associated with an API based on information received with the API (e.g., an API specification, etc.). The API management device, based on a deprecation rule, can determine portions of an API that have removed, modified, or the like in accordance to and/or in violation of the one or more rules (e.g., one or more rules of an API governance policy, etc.), such as a determined time period. The determined time period can be based on the visibility attribute, the stability index, or any other factor. For example, the API management device can determine whether a portion of an API and/or the API update has been removed, modified, or the like, such as by an API update, by determining a date of deprecation associated with the portion of the API and/or the API update. The API management device can determine a deprecation period for the API and/or the API update and determine whether a time period between a date of the API and/or the API update and the date of deprecation exceeds the deprecation period.

Based on whether the API update violates the one or more rules, the API management device may either deny or allow the action. At step 430, the action may be denied based on a determination that the API update violates the one or more rules. Denying the action may comprise denying a command to perform a code commit (e.g., a push request etc.), or any other operation. Denying the command to implement the API and/or the API update may prevent APIs and/or the API updates from being committed to an implementation device (e.g., the implementation device 116, a code repository, a code executor, a production server, etc.) that does not adhere to an expected API functionality and/or convention, even though the APIs and/or the API updates (e.g., source code) may compile without error and/or pass through a test suite. At step 440, the action may be allowed based on a determination that the API update does not violate the one or more rules. Allowing the action to may comprise allowing a command to perform a code commit (e.g., a push request etc.), or any other operation.

Figure 5:
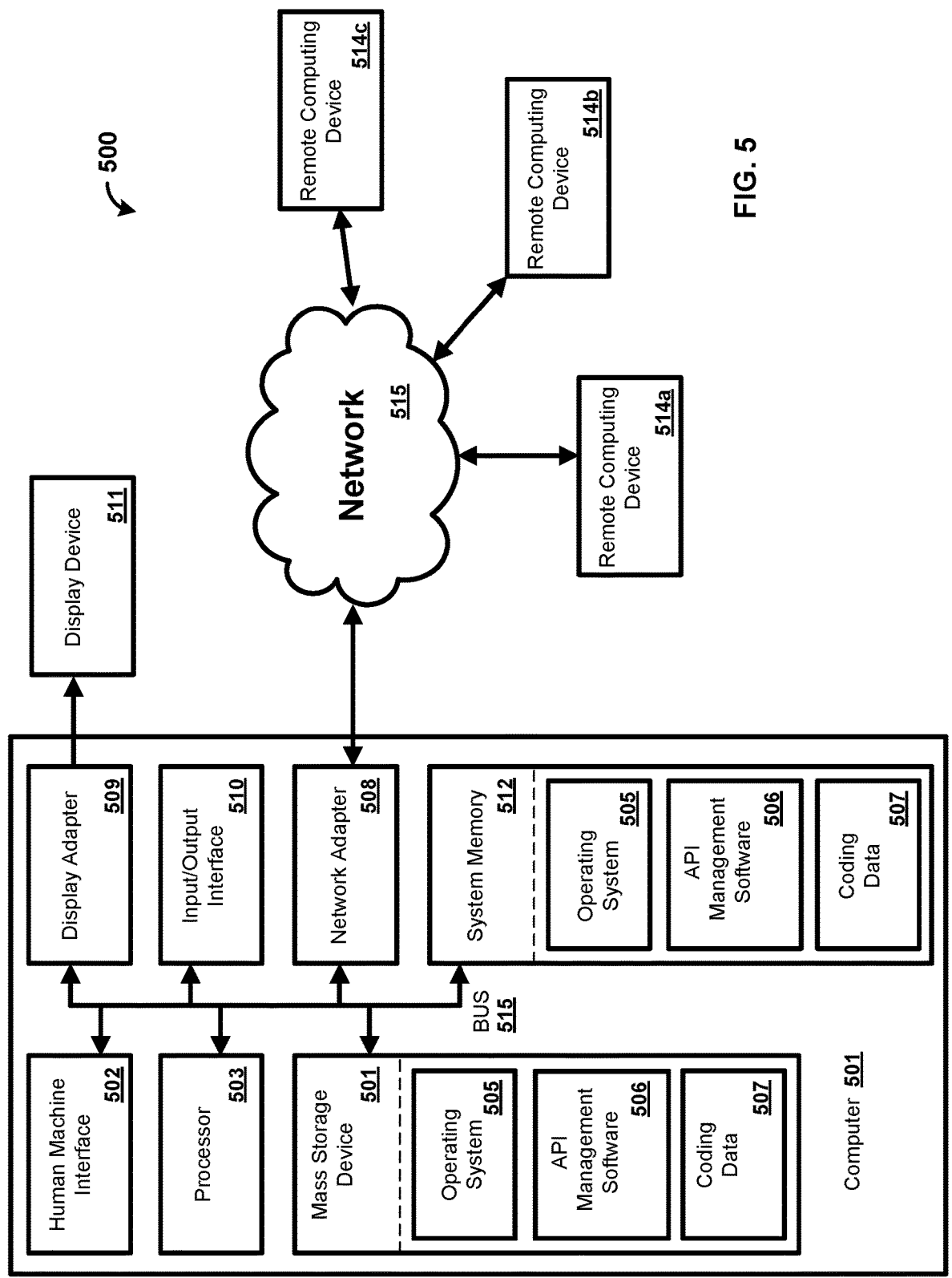
FIG. 5 is a block diagram of an example computing device.

In an aspect, the methods and systems can be implemented on a computer 301 as illustrated in FIG. 5 and described below. By way of example, the client device 102, the API management device 104, and the implementation device 116 of FIG. 1 can be a computer as illustrated in FIG. 5. Similarly, the methods and systems disclosed can utilize one or more computers to perform one or more functions in one or more locations. FIG. 5 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 501. The components of the computer 501 can comprise, but are not limited to, one or more processors 503, a system memory 512, and a system bus 513 that couples various system components including the one or more processors 503 to the system memory 512. The system can utilize parallel computing.

The system bus 513 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 513, and all buses specified in this description can also be implemented over a wired or wireless network connection and each of the subsystems, including the one or more processors 503, a mass storage device 504, an operating system 505, API management software 506, coding data 507, a network adapter 508, the system memory 512, an Input/Output Interface 510, a display adapter 509, a display device 511, and a human machine interface 502, can be contained within one or more remote computing devices 514a,b,c at physically separate locations, connected through buses of this form, in effect implementing a fully distributed system.

The computer 501 typically comprises a variety of computer readable media. Exemplary readable media can be any available media that is accessible by the computer 501 and comprises, for example and not meant to be limiting, both volatile and non-volatile media, removable and non-removable media. The system memory 512 comprises computer readable media in the form of volatile memory, such as random access memory (RAM), and/or non-volatile memory, such as read only memory (ROM). The system memory 512 typically contains data such as the coding data 507 and/or program modules such as the operating system 505 and the API management software 506 that are immediately accessible to and/or are presently operated on by the one or more processors 503.

In another aspect, the computer 501 can also comprise other removable/non-removable, volatile/non-volatile computer storage media. By way of example, FIG. 5 illustrates the mass storage device 504 which can provide non-volatile storage of computer code, computer readable instructions, data structures, program modules, and other data for the computer 501. For example and not meant to be limiting, the mass storage device 504 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 504, including by way of example, the operating system 505 and the API management software 506. Each of the operating system 505 and the API management software 506 (or some combination thereof) can comprise elements of the programming and the API management software 506. The coding data 507 can also be stored on the mass storage device 504. The coding data 507 can be stored in any of one or more databases known in the art. Examples of such databases comprise, DB2®, Microsoft® Access, Microsoft® SQL Server, Oracle®, MySQL, PostgreSQL, and the like. The databases can be centralized or distributed across multiple systems.

In another aspect, the user can enter commands and information into the computer 501 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 503 via the human machine interface 502 that is coupled to the system bus 513, but can be connected by other interface and bus structures, such as a parallel port, game port, an IEEE 1394 Port (also known as a Firewire port), a serial port, or a universal serial bus (USB).

In yet another aspect, the display device 511 can also be connected to the system bus 513 via an interface, such as the display adapter 509. It is contemplated that the computer 501 can have more than one display adapter 309 and the computer 501 can have more than one display device 511. For example, the display device 511 can be a monitor, an LCD (Liquid Crystal Display), or a projector. In addition to the display device 511, other output peripheral devices can comprise components such as speakers (not shown) and a printer (not shown) which can be connected to the computer 501 via the Input/Output Interface 510. Any step and/or result of the methods can be output in any form to an output device. Such output can be any form of visual representation, including, but not limited to, textual, graphical, animation, audio, tactile, and the like. The display device 511 and computer 501 can be part of one device, or separate devices.

The computer 501 can operate in a networked environment using logical connections to one or more remote computing devices 514a,b,c. By way of example, a remote computing device can be a personal computer, portable computer, smartphone, a server, a router, a network computer, a peer device or other common network node, and so on. Logical connections between the computer 501 and a remote computing device 514a,b,c can be made via a network 515, such as a local area network (LAN) and/or a general wide area network (WAN). Such network connections can be through the network adapter 508. The network adapter 508 can be implemented in both wired and wireless environments. Such networking environments are conventional and commonplace in dwellings, offices, enterprise-wide computer networks, intranets, and the Internet.

For purposes of illustration, application programs and other executable program components such as the operating system 505 are illustrated herein as discrete blocks, although it is recognized that such programs and components reside at various times in different storage components of the computing device 501, and are executed by the one or more processors 503 of the computer. An implementation of the API management software 506 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the methods and systems. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow;

plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
 receiving, by a management device from a client device, a command for an implementation device to perform a code commit comprising an Application Program Interface (API) update;
 determining, based on the API update modifying a visibility attribute of a portion of the API from Public to Private that the API update violates one or more rules of an API governance policy, wherein the one or more rules ocmprises a deprecation policy; and
 determining, based on the API update violating the one or more rules of the API governance policy, that performance of the code commit by the implementation device is to be denied; wherein the API update is not committed to the implementation device;
 wherein determining that the API update violates the one or more rules comprises determining whether the API update removes the portion of the API in violation of the deprecation policy by:
  determining a date of deprecation associated with the portion of the API;
  determining a deprecation period for the portion of the API; and
  determining whether a time period between a date of the API update and the date of deprecation exceeds the deprecation period.

2. The method of claim 1, wherein determining that the API update violates the one or more rules comprises determining whether a version number associated with the API update is incremented according to the one or more rules.

3. The method of claim 1, wherein the portion of the API is a non-deprecated portion of the API.

4. The method of claim 1, wherein determining that the API update violates the one or more rules comprises: determining that a documentation associated with the portion of the API is updated.

5. The method of claim 1, wherein determining that the API update violates the one or more rules comprises: determining that the portion of the API is associated with a test suite.

6. The method of claim 1, wherein: the client device comprises at least one of: a code generation device, a code management device, or an API development device; the management device comprises at least one of: an interface device, a version control device, or a version control system; and the implementation device comprises at least one of: a code repository, a code executor, or a production server.

7. A method comprising:
 receiving, by a management device from a client device, a command for an implementation device to perform an action with a version control system, wherein the action is associated with an Application Program Interface (API) update; determining, based on the API update not modifying a visibility attribute of a portion of the API from Public to Private, that the API update does not violate one or more rules of an API governance policy, wherein the one or more rules comprises a deprecation policy; and allowing the implementation device to perform the action with the version control system based on the API update not violating the one or more rules of the API governance policy;
 wherein determining that the API update does not violate the one or more rules comprises determining whether the API update removes the portion of the API in violation of the deprecation policy by: determining a date of deprecation associated with the portion of the API; determining a deprecation period for the portion of the API; and determining whether a time period between a date of the API update and the date of deprecation exceeds the deprecation period.

8. The method of claim 7, wherein the action comprises a code commit to the version control system.

9. The method of claim 7, wherein the action comprises a code pull from the version control system.

10. The method of claim 7, wherein the action comprises a deployment to a server.

11. The method of claim 7, wherein determining that the API update does not violate the one or more rules comprises determining whether a version number associated with the API update is incremented according to the one or more rules.

12. The method of claim 7, wherein the portion of the AP' is a non-deprecated portion of the API.

13. The method of claim 7, wherein determining that the API update does not violate the one or more rules comprises: determining that a documentation associated with the portion of the API is not updated.

14. The method of claim 8, wherein determining that the API update does not violate the one or more rules comprises: determining that the portion of the API is not associated with a test suite.

15. A method comprising: receiving, by a management device from a client device, a command for a implementation device to perform an action associated with an Application Program Interface (API) update and a portion of the API; determining that the API update does not deprecate the portion of the API, determining, based on the API update not deprecating the portion of (the API, that the API update violates one or more rules of an API governance policy, wherein the one or more rules comprises a deprecation policy; and denying, by the management device, performance of the action by the implementation device, based on the API update violating the one or more rules of the API governance policy;
 wherein determining that the API update violates the one or more rules comprises determining whether the API update removes the portion of the API in violation of the deprecation policy by: determining a date of deprecation associated with the portion of the API; determining a deprecation period for the portion of the API; and determining whether a time period between a date of the API update and the date of deprecation exceeds the deprecation period.

16. The method of claim 15, wherein the action comprises one or more of a code commit, a code pull, or a deployment to a server.

* * * * *